US006743825B1

(12) United States Patent
Dawson et al.

(10) Patent No.: US 6,743,825 B1
(45) Date of Patent: Jun. 1, 2004

(54) POLY(BROMOARYL)ALKANE ADDITIVES AND METHODS FOR THEIR PREPARATION AND USE

(75) Inventors: Raymond B. Dawson, Baton Rouge, LA (US); Saadat Hussain, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 10/213,113

(22) Filed: Aug. 5, 2002

Related U.S. Application Data

(60) Provisional application No. 60/309,810, filed on Aug. 3, 2001.

(51) Int. Cl.[7] .................... A01N 29/04; A01N 29/10; A01N 31/03
(52) U.S. Cl. .................... 514/754; 514/743; 514/751; 514/753; 514/747; 514/757; 570/181; 570/182; 570/184; 570/185; 570/252; 424/78.08
(58) Field of Search .................... 570/181, 182, 570/184, 185, 252; 514/743, 751, 753, 754, 747, 757; 424/78.08

(56) References Cited

U.S. PATENT DOCUMENTS

| | | |
|---|---|---|
| 2,022,634 A | 11/1935 | Britton et al. |
| 2,033,612 A | 3/1936 | Clark et al. |
| 2,240,718 A | 5/1941 | Schiffman et al. |
| 2,244,284 A | 6/1941 | Britton et al. |
| 2,556,721 A | 6/1951 | Gislon et al. |
| 2,607,802 A | 8/1952 | Britton et al. |
| 2,979,637 A | 4/1961 | Welna |
| 3,029,295 A | 4/1962 | Thermet et al. |
| 3,062,899 A | 11/1962 | Sax |
| 3,141,860 A | 7/1964 | Sauer et al. |
| 3,232,959 A | 2/1966 | Hahn |
| 3,285,965 A | 11/1966 | Jenkner |
| 3,331,797 A | 7/1967 | Kopetz et al. |
| 3,366,694 A | 1/1968 | Thompson |
| 3,441,524 A | 4/1969 | Burger et al. |
| 3,591,645 A | 7/1971 | Selwitz |
| 3,639,302 A | 2/1972 | Brown et al. |
| 3,711,562 A | 1/1973 | Maul et al. |
| 3,733,366 A | 5/1973 | Burk |
| 3,752,856 A | 8/1973 | Nagy et al. |
| 3,763,248 A | 10/1973 | Mitchell |
| 3,833,674 A | 9/1974 | Brackenridge |
| 3,839,140 A | 10/1974 | Tyler et al. |
| 3,845,146 A | 10/1974 | Moore et al. |
| 3,850,882 A | 11/1974 | Underwood et al. |
| 3,883,481 A | 5/1975 | Kopetz et al. |
| 3,911,033 A | 10/1975 | Schaffner et al. |
| 3,931,081 A | 1/1976 | Dany et al. |
| 3,932,542 A | 1/1976 | Gerns |
| 3,959,387 A | 5/1976 | Brackenridge |
| 3,962,164 A | 6/1976 | Praetzel et al. |
| 3,965,197 A | 6/1976 | Stepniczka |
| 3,969,387 A | 7/1976 | Merkl |
| 3,971,758 A | 7/1976 | Anderson et al. |
| 4,024,092 A | 5/1977 | Sonnenberg |
| 4,067,930 A | 1/1978 | Versnel et al. |
| 4,072,658 A | 2/1978 | Okamoto et al. |
| 4,085,153 A | 4/1978 | Schneider et al. |
| 4,130,605 A | 12/1978 | Barkhuff, Jr. |
| 4,150,066 A | 4/1979 | Kudo et al. |
| 4,223,169 A | 9/1980 | Barda |
| 4,230,821 A | 10/1980 | Bertrand |
| 4,276,189 A | 6/1981 | Jackisch |
| 4,287,373 A | 9/1981 | Garman et al. |
| RE30,778 E | 10/1981 | Hahn et al. |
| 4,301,058 A | 11/1981 | Neukirchen et al. |
| 4,327,227 A | 4/1982 | Ayres et al. |
| 4,348,306 A | 9/1982 | Mischutin |
| 4,352,909 A | 10/1982 | Barda et al. |
| 4,396,730 A | 8/1983 | Imahashi |
| 4,442,017 A | 4/1984 | Blumberg et al. |
| 4,505,850 A | 3/1985 | Pearson |
| 4,521,633 A | 6/1985 | Pedjac |
| 4,532,287 A | 7/1985 | Bill et al. |
| 4,569,596 A | 2/1986 | Romanchik et al. |
| 4,639,481 A | 1/1987 | Giles, Jr. |
| 4,639,486 A | 1/1987 | Liu |
| 4,659,021 A | 4/1987 | Bark et al. |
| 4,666,947 A | 5/1987 | Brichta et al. |
| 4,717,776 A | 1/1988 | Brackenridge et al. |
| RE32,606 E | 2/1988 | Stepniczka |
| 4,740,629 A | 4/1988 | Brackenridge et al. |
| 4,741,864 A | 5/1988 | Avakian et al. |
| 4,751,260 A | 6/1988 | Kress et al. |

(List continued on next page.)

FOREIGN PATENT DOCUMENTS

| | | |
|---|---|---|
| CA | 708209 | 4/1965 |
| DE | 87752 | 1/1895 |
| DE | 2148276 | 4/1972 |
| DE | 2950877 A1 | 6/1981 |
| DE | 3422673 A1 | 12/1985 |
| EP | 0347116 A2 | 12/1989 |
| EP | 0469569 A2 | 2/1992 |

(List continued on next page.)

OTHER PUBLICATIONS

Letsinger et al. J. Amer. Chem. Soc. vol. 81, 1959, pp. 3013–3017.*

(List continued on next page.)

*Primary Examiner*—Johann R. Richter
*Assistant Examiner*—Elvis O. Price

(57) ABSTRACT

An additive mixture useful as a flame retardant is described. The mixture is comprised of (i) a poly(bromophenyl)alkane having in the molecule in the range of 13 to 60 carbon atoms and in the range of two to four aryl groups and (ii) a poly(bromophenyl)bromoalkane having in the molecule in the range of 13 to 60 carbon atoms and in the range of two to four aryl groups, said poly(bromophenyl)bromoalkane being in an amount which is greater than 25 wt %, based on the total weight of the additive mixture. A facile process for making the poly(bromophenyl)bromoalkane is also described.

20 Claims, 1 Drawing Sheet

U.S. PATENT DOCUMENTS

| | | | |
|---|---|---|---|
| 4,778,933 A | 10/1988 | McKinnie et al. |
| 4,814,525 A | 3/1989 | Rule et al. |
| 4,829,118 A | 5/1989 | Favstritsky et al. |
| 4,832,873 A | 5/1989 | Favstritsky et al. |
| 4,849,547 A | 7/1989 | Stollar et al. |
| 4,865,880 A | 9/1989 | Silbermann et al. |
| 4,871,882 A | 10/1989 | Stollar et al. |
| 4,892,892 A | 1/1990 | Favstritsky et al. |
| 4,925,994 A | 5/1990 | Mais et al. |
| 4,929,785 A | 5/1990 | Hussain |
| 4,983,781 A | 1/1991 | Desmurs et al. |
| 4,990,707 A | 2/1991 | Mais et al. |
| 5,003,117 A | 3/1991 | Hussain |
| 5,008,477 A | 4/1991 | Hussain |
| 5,030,778 A | 7/1991 | Ransford |
| 5,036,126 A | 7/1991 | Rinehart et al. |
| 5,039,729 A | 8/1991 | Brackenridge et al. |
| 5,041,687 A | 8/1991 | McKinnie et al. |
| 5,053,447 A | 10/1991 | Hussain |
| 5,055,235 A | 10/1991 | Brackenridge et al. |
| 5,059,650 A | 10/1991 | Goettsch et al. |
| 5,077,334 A | 12/1991 | Hussain |
| 5,124,496 A | 6/1992 | Templeton et al. |
| 5,218,017 A | 6/1993 | Doucet et al. |
| 5,235,000 A | 8/1993 | McKinnie |
| 5,302,768 A | 4/1994 | Hussain |
| 5,324,874 A | 6/1994 | Ransford et al. |
| 5,401,890 A | 3/1995 | Parks |
| 5,457,248 A | 10/1995 | Mack et al. |

FOREIGN PATENT DOCUMENTS

| | | |
|---|---|---|
| GB | 981833 | 1/1965 |
| GB | 991067 | 5/1965 |
| GB | 1350826 | 4/1974 |
| GB | 1411524 | 10/1975 |
| GB | 1472383 | 5/1977 |
| GB | 1572659 | 7/1980 |
| GB | 2081253 A | 2/1982 |
| JP | 5173548 | 6/1976 |
| JP | 5239639 | 3/1977 |
| JP | 53112822 | 10/1978 |
| JP | 53116332 | 10/1978 |
| JP | 53116333 | 10/1978 |
| JP | 53116334 | 10/1978 |
| JP | 5444623 | 4/1979 |
| JP | 5670059 A | 6/1981 |
| JP | 5670060 | 6/1981 |
| JP | 60166333 | 8/1985 |
| JP | 195143 A | 4/1989 |
| JP | 1146926 A | 6/1989 |
| JP | 3232825 | 10/1991 |
| JP | 10175893 A2 | 6/1998 |
| WO | WO 9608457 A1 | 3/1996 |
| WO | WO 9615087 A1 | 5/1996 |

OTHER PUBLICATIONS

Green, et al.; "Flame Retarding Thermoplastic Styrenic Resins"; Fire Retardants: Proceedings of 1974 International Symposium on Flammability And Fire Retardants; Cornwall, Ontario Canada; May 1974; Technomic Publishing Co. Inc.; 1975 pp. 68–76.

Vogel, Dr. Hans; "Flammfestmachen von Kunststoffen" Technologie Der Makromolekularen Chemie; 1966; pp. 49; (not translated).

Gassman, et al.; "The 3–(Fluoromethyl)phenyl Group. A Useful Moiety for the Study of Solvolysis Reactions with Large Negative ρ Values"; The Journal of Organic Chemistry, vol. 47, No. 20; Sep. 1982; pp. 4002–4004.

Inaba, et al.; "Highly Reactive Metallic Nickel: Reductive Homocoupling Reagent for Benzylic Mono– and Polyhalides"; The Journal of Organic Chemistry; vol. 49; No. 12; Jun. 1984; pp. 2093–2098.

Corey, et al.; "Silacarbocycles From Ring Expansion"; Journal of Organometallic Chemistry; vol. 210; No. 2; May 1981; pp. 149–161.

Golounin; "Formation of Hexabromobenzene in The Bromination of $(C_6H_5)_2X$ Compounds"; translated from Zhurnal Organicheskoi Khimii; vol. 12; No. 8; pp. 1834–1835; Aug. 1976; Original article submitted Nov. 1975.(2 pages).

Encyclopedia of Polymer Science And Technology; vol. 7; "Fire Retardancy"; 1967; pp. 3.

Kirk–Othmer Encyclopedia of Chemical Technology; John Wiley & Sons, New York; Third Edition; vol. 10; "Halogenated Flame Retardants" 1980; pp. 373.

Kirk–Othmer Encyclopedia of Chemical Technology; John Wiley & Sons, Third Edition; vol. 23; "UV Stabilizers"; 1983; pp. 615–627.

An American National Standard; ASTM Designation: E 308—85—"Standard Method for Computing the Colors of Objects by Using the CIE System"; 1985; pp. 242–289.

An American National Standard; ASTM Designation: D 1925—70—(Reapproved 1988); "Standard Test Method for Yellowness Index of Plastics"; pp. 163–165.

Kerscher, Dr. Utto; "Bromine–Containing Flameproofing Agents For Fireproofing of Plastics"; translated from Kunststoff Journal 13(1), 6, 8, 10, 14, 16; 1979; pp. 1–14.

Kolesnikov, G.S. et al.; "Condensation of Benzene With 1,2–dichloroethane"; Chemical Abstracts; vol. 46; 7084 g; 1952; 1 page.

Butin, K.P. et al.; "Synthesis and Some Properties of Pentachloro and Pentabromobenzyl Compounds of Mercury"; Chemical Abstracts; vol. 98; 98:160866p; 1983; 1 page.

CAS Registry Handbook, 623RL; 84852–53–9; Supplement Part 1; 1983; 1 page.

Mossaad, Amgad S. et al.; U.S. patent application Ser. No. 06/758,967, filed Jul. 25, 1985, entitled "Polybrominated Diphenylethane Fire Retardant"; 11 pages.

* cited by examiner

POLY(BROMOARYL)ALKANE ADDITIVES AND METHODS FOR THEIR PREPARATION AND USE

REFERENCE TO RELATED APPLICATION

The benefit of the filing date priority of U.S. Provisional Patent Appl. No. 60/309,810, filed on Aug. 3, 2001, is hereby claimed.

BACKGROUND

Polyhalogenated diarylalkanes, e.g. decabromodiphenylethane, are known flame retardants for use in polyolefin and polystyrenic-based formulations. On a commercial basis, the polyhalogenated diarylalkane is supplied to the formulation as a product predominant in the polyhalogenated diarylalkane selected. Heretofore, known formulations of polyhalogenated diarylalkanes were brominated at the aryl rings(s) exclusively. Thus, such formulations were thus less desirable when the circumstance of use of the flame retardant called for the beneficial aspects of an aliphatically brominated composition.

Figure 1:
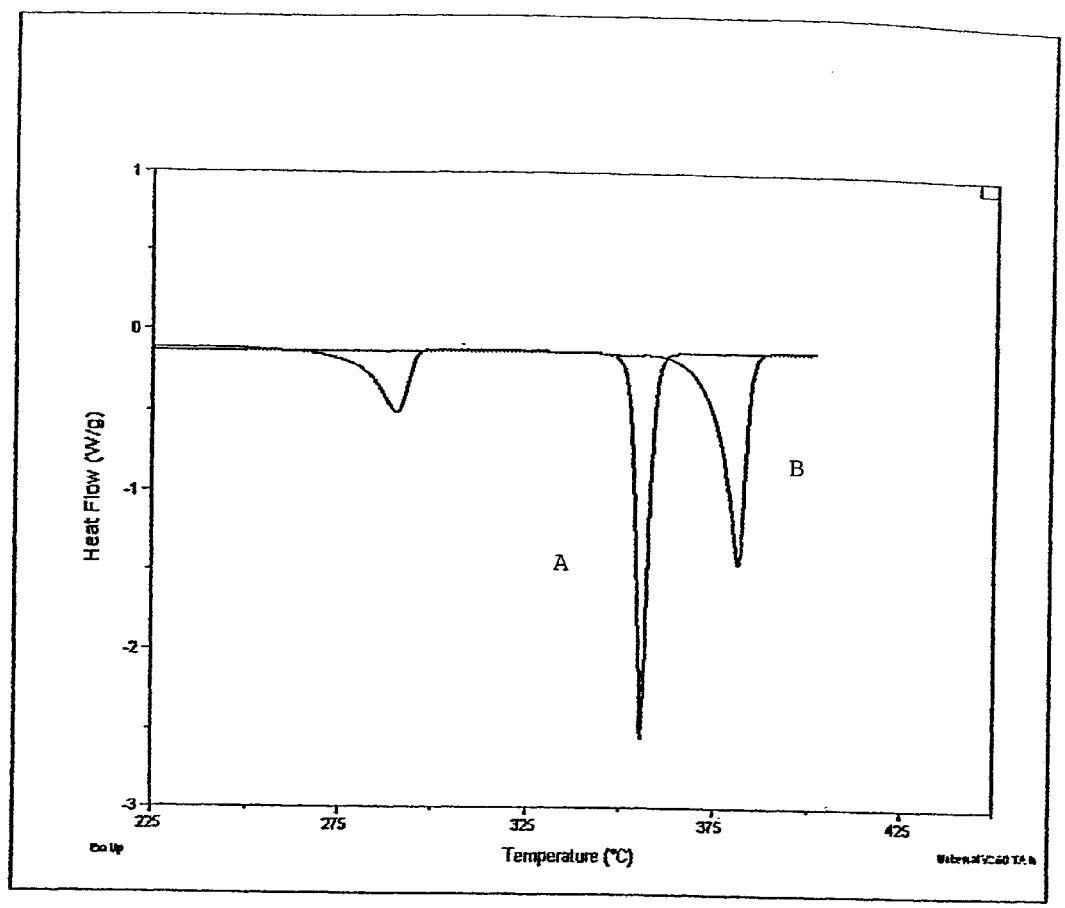
FIG. 1 is a differential scanning calorimetry curve of deca- and dodecabromodiphenylethane.

Thus, a need exists for a flame retardant formulation which combines the beneficial characteristics of flame retardants having aryl group bromine substitution and flame retardants having aliphatic bromine substitution.

THE INVENTION

This invention meets this need by providing, inter alia, an additive mixture comprised of (i) a poly(bromoaryl)alkane and (ii) a poly(bromoaryl)bromoalkane. The alkane bridge of the poly(bromoaryl)bromoalkane has at least one bromine atom substituent, and preferably has at least one bromine atom substituent on each carbon atom of the bridge. Although not required, the aryl groups of both components (i) and (ii) are preferably perbrominated. Additives of this invention exhibit surprisingly beneficial fire retardant characteristics, and macromolecular formulations which include these additives having surprisingly beneficial physical properties.

In one embodiment of this invention, an additive mixture comprises (i) a poly(bromoaryl)alkane having in the molecule in the range of 13 to 60 carbon atoms and in the range of two to four aryl groups and (ii) a poly(bromoaryl)bromoalkane having in the molecule in the range of 13 to 60 carbon atoms and in the range of two to four aryl groups, wherein at least one of the aryl groups of each of (i) and (ii) has at least 7 carbon atoms. The alkane bridge of the poly(bromoaryl)bromoalkane preferably will have at least two carbon atoms in the bridge and at least two bromine atom substituents on the bridge, and even more preferably will have at least two carbon atoms in the bridge and a number of bromine substituents on the bridge equal to the number of carbon atoms in the bridge. Preferably, the poly(bromoaryl)bromoalkane is present in an amount which is greater than 10 wt %, and more preferably greater than 20 wt %, and most preferably greater than 25 wt %, based on the total weight of the additive mixture.

In another embodiment of this invention, an additive mixture comprises (i) a poly(bromoaryl)alkane having in the molecule in the range of 13 to 60 carbon atoms and in the range of two to four aryl groups, the molecule having less than complete bromination of the available aryl group substitution sites, (ii) a poly(perbromoaryl)alkane having in the molecule in the range of 13 to 60 carbon atoms and in the range of two to four aryl groups, and (iii) a poly(perbromoaryl)bromoalkane having in the molecule in the range of 13 to 60 carbon atoms and in the range of two to four aryl groups, wherein at least one of the aryl groups of each of (i) and (ii) has at least 7 carbon atoms. The alkane bridge of the poly(bromoaryl)bromoalkane preferably will have at least two carbon atoms in the bridge and at least two bromine atom substituents on the bridge, and even more preferably will have at least two carbon atoms in the bridge and a number of bromine substituents on the bridge equal to the number of carbon atoms in the bridge. Preferably, the poly(bromoaryl)bromoalkane is present in an amount which is greater than 10 wt %, and more preferably greater than 20 wt %, and most preferably greater than 25 wt %, based on the total weight of the additive mixture.

In a preferred embodiment of this invention, an additive mixture comprises (i) a poly(bromophenyl)alkane having in the molecule in the range of 13 to 60 carbon atoms and in the range of two to four phenyl groups and (ii) a poly(bromophenyl)bromoalkane having in the molecule in the range of 13 to 60 carbon atoms and in the range of two to four phenyl groups, said poly(bromophenyl)bromoalkane being in an amount which is greater than 20 wt %, based on the total weight of the additive mixture, and more preferably being in an amount which is greater than 25 wt %, based on the total weight of the additive mixture. The alkane bridge of the poly(bromoaryl)bromoalkane preferably will have at least two carbon atoms in the bridge and at least two bromine atom substituents on the bridge, and even more preferably will have at least two carbon atoms in the bridge and a number of bromine substituents on the bridge equal to the number of carbon atoms in the bridge.

The poly(bromoaryl)alkane in additives of this invention preferably has in the range of 13 to about 24 carbon atoms, and the alkane portion of the molecule preferably has in the range of 1 to about 10 carbon atoms, more preferably in the range of 2 to about 10 carbon atoms, and most preferably in the range of 2 to about 6 carbon atoms. When the alkane contains 2 or more carbon atoms, it is preferred that at least each terminal carbon atom is aryl substituted. Di(bromoaryl)alkanes are a preferred species. The brominated aryl groups are homocyclic, and may have alkyl substituents or oxygen or nitrogen-containing substitutents, e.g., —OH or —NH$_2$. The aryl groups each have at least one bromine substituent, preferably having two or more bromine substituents, and more preferably being perbrominated. Alkyl substituents on the aryl ring, if present, have in the range of one to about four carbon atoms, and most preferably one carbon atom. Preferred aryl groups are naphthyl and phenyl, with phenyl being particularly preferred. Examples of other suitable aryl groups that may be used include tolyl, xylyl, isopropylphenyl, naphthyl, 6-ethylnaphthyl, anthryl, phenanthryl, chrysyl, pyrenyl, and 9,10-benzophenanthryl. It is preferred that all aryl groups of the molecule be the same. Examples of suitable poly(perbromoaryl)alkanes include decabromodiphenylmethane, dodecabromodi(6-ethylnaphthyl)methane, decabromo-1,1-diphenylethane, pentadecabromotriphenylethane, tetradecabromo-1,2-dinaphthylethane, dodecabromo-1-naphthyl-2-phenylethane, decabromo-1,2-diphenylpropane, decabromo-2,2-diphenylpropane, decabromo-1,3-diphenylpropane, pentadecabromo-1,2,3-triphenylpropane, decabromo-1,4-diphenylbutane, octadecabromo-1,3-dianthrylbutane, decabromo-2,3-dimethyl-1,4- diphenylbutane, decabromo-2-ethyl-3-methyl-1,4-diphenylbutane, nonabromo-1-phenyl-5-tolylpentane, decabromo-1,5-diphenylhexane, octadecabromo-1,6-diphenanthrylhexane, decabromo-2-methyl-1,6diphenylhexane, hexadecabromo-2-naphthyl-6-pyrenylheptane, octabromo-1,8-di(tolyl)octane, hexabromo-1,9-di(xylyl)nonane, octacosabromo-1,4,6,9-tetranaphthylnonane, tetradecabromo-1,10-dinaphthyldecane, eicosabromo-1,1,10,10-tetraphenyldecane, and the like, including lower aryl-brominated analogs, i.e., analogs wherein the number of bromine substituents on the aryl groups is less than the number of carbon atoms in the aryl groups eligible for bromine substitution. Decabromodiphenylmethane and decabromo-1,2-diphenylethane are highly preferred poly (perbromoaryl)alkanes.

The poly(bromoaryl)bromoalkane of additives of this invention are as described above for the poly(bromoaryl) alkanes, but are further brominated by substitution of at least one bromine atom on the alkane bridge, and more preferably at least one bromine atom on each of the carbon atoms in the alkane bridge. Higher levels of bromination of the carbon atoms in the alkane bridge are also envisioned by, and are within the scope of, this invention, as long as thermal and UV stability for the application at hand are not significantly adversely affected by such additional bromination. Examples of suitable poly(perbromoaryl)bromoalkanes in which one or more carbon atoms of the alkane bridge is bromine-substituted thus include undecabromodiphenylmethane, tridecabromodi(6-ethylnaphthyl)methane, undecabromo-1,1-diphenylethane, hexadecabromotriphenylethane, pentadecabromo-1,2-dinaphthylethane, hexadecabromo-1,2-dinaphthylethane, tridecabromo-1-naphthyl-2-phenylethane, tetradecabromo-1-naphthyl-2-phenylethane, undecabromo-1,2-diphenylpropane, dodecabromo-1,2-diphenylpropane, tridecabromo-1,2-diphenylpropane, undecabromo-2,2-diphenylpropane, dodecabromo-2,2-diphenylpropane, tridecabromo-2,2-diphenylpropane, undecabromo-1,3-diphenylpropane, dodecabromo-1,3-diphenylpropane, tridecabromo-1,3-diphenylpropane, hexadecabromo-1,2,3-triphenylpropane, heptadecabromo-1,2,3-triphenylpropane, octadecabromo-1,2,3-triphenylpropane, undecabromo-1,4-diphenylbutane, dodecabromo-1,4-diphenylbutane, tridecabromo-1,4-diphenylbutane, tetradecabromo-1,4-diphenylbutane, nonadecabromo-1,3-dianthrylbutane, undecabromo-2,3-dimethyl-1,4-diphenylbutane, undecabromo-2-ethyl-3-methyl-1,4-diphenylbutane, decabromo-1-phenyl-5-tolylpentane, undecabromo-1,5-diphenylhexane, nonadecabromo-1,6-diphenanthrylhexane, undecabromo-2-methyl-1,6-diphenylhexane, heptadecabromo-2-naphthyl-6-pyrenylheptane, nonabromo-1,8-di(tolyl)octane, heptabromo-1,9-di(xylyl)nonane, nonacosabromo-1,4,6,9-tetranaphthylnonane, pentadecabromo-1,10-dinaphthyldecane, heneicosabromo-1,1,10,10-tetraphenyldecane, and the like, including higher and lower aliphatically brominated analogs and lower aryl-brominated analogs. Undecabromodiphenylmethane and dodecabromo-1,2-diphenylethane are highly preferred poly (perbromoaryl)bromoalkanes. In this context, the terms higher and lower are meant to refer to analogs wherein the number of bromine substituents on the aryl groups or alkane bridge, as the case may be, is more (higher) or less (lower).

The additives of this invention may be fabricated using a variety of methods. Of course, components of the additives may be separately fabricated using different processes and subsequently mixed together to form the additives, or a fabrication process may be adapted to permit the formation of additives of this invention in a single process. Regardless of the method chosen, the additive must be formed so as to contain at least one poly(bromoaryl)bromoalkane, wherein the alkane bridge is substituted with at least one bromine atom, and preferably at least two bromine atoms, more preferably at least one bromine atom at each carbon atom in the bridge. Exemplary methods of fabrication of poly (bromoaryl)alkanes are taught, e.g., in commonly owned U.S. Pat. Nos. 5,008,477, 5,030,778, 5,077,334, 5,124,496, 5,302,768, 5,324,874 and 5,401,890, the entire disclosures of which are incorporated herein by reference. The poly (bromoaryl)alkane produced in accordance with a known method may be further brominated at the alkane bridge through an aliphatic bromination step in the presence of a brominating agent, either in the form of entrained bromine or in the form of a brominating agent which has been brought into contact with the poly(bromoaryl)alkane. Examples of suitable brominating agents include elemental bromine (either in liquid or vapor form), N-bromosuccinimide, an organic brominating agent such as 1,3-dibromodimethylhydantoin, and the like, with elemental bromine being preferred since additional purification steps may be required when using other brominating agents. Such aliphatic bromination may be carried out using, e.g., one of the free radical bromination processes such as photochemical bromination, thermal bromination, peroxide or azo compound bromination. Because of the highly corrosive conditions and pressure requirements, thermal bromination will in some situations be less preferred to photochemical bromination or the reactions in which peroxides or other suitable are used.

In photochemical bromination, the poly(bromoaryl) alkane is placed in the presence of a brominating agent and a solvent which is able to at least partially dissolve the poly(bromoaryl)alkane under the reaction conditions, and the mixture is exposed to a sufficient type and amount of light to cause the brominating agent to cleave to form a bromine atom which reacts with the poly(bromoaryl)alkane, and specifically with a hydrogen atom at the alkane bridge of the poly(bromoaryl)alkane. The light employed may be any light as long as it is of sufficient strength to cause the reaction to occur. The reaction conditions are not temperature dependent, as long as at least a portion of the reagents remain in solution during the process. Maintaining an elevated temperature during the process is also not critical, but it can assist the reaction speed if some elevated temperature, i.e., a temperature above 25° C., is employed. Adding pressure to the conditions can also speed up the reaction time, although the reaction can conceivably be conducted at subatmospheric, atmospheric, and super atmospheric pressure. Maintaining substantially anhydrous conditions during the process is preferred, as is the use of an inert atmosphere such as, e.g., nitrogen or argon.

In thermal bromination, the poly(bromoaryl)alkane is heat treated to a temperature of at least 250° C., and more preferably to at least 300° C., under substantially closed reactor conditions to prevent release of bromine in the form of, e.g., HBr, to effectuate a thermal bromination of at least one or more of the carbon atoms in the alkane bridge. Typically, a maximum temperature for poly(aryl)alkane thermal bromination will be about 350° C. Generally speaking, the longer the thermal bromination is conducted, the more bromination will occur at the available sites of the alkane bridge. The thermal bromination is carried out for a period of time the length of which will vary depending upon the desired level of aliphatic bromination, the starting poly (bromoaryl)alkane and the surrounding reaction conditions. The amount of poly(bromoaryl)bromoalkane which is formed from the poly(bromoaryl)alkane product will be affected by the amount of available brominating agent and the level and duration of heat applied to the reaction mass. Generally speaking, in the case of thermal bromination of a decabromodiphenylethane mixture having a minor (e.g., 5 wt %) amount of dodecabromodiphenylethane, the time necessary to convert the mixture to one having at least 25 wt % dodecabromodiphenylethane will be in the range of about 1 to about 6 hours, more preferably about 2 to about 4 hours, when the temperature is maintained at about 300° C. Preferably, the amount of brominating agent and heat applied, and the duration of the bromination process will be selected to convert poly(bromoaryl)alkane to a a mixture of poly(bromoaryl)alkane and a significant amount of poly (bromoaryl)bromoalkane. By significant amount it is meant that at least about 5 wt %, preferably at least about 20 wt % and more preferable at least about 25 wt %, by weight of the resulting product, is present. When the poly(bromoaryl) alkane to be heat-treated is decabromodiphenylethane, the preferred amount of dodecabromodiphenylethane produced is greater than 20 wt % and more preferably greater than 25 wt %, based upon the total weight of the end product. To form this amount of dodecabromodiphenylethane, excess brominating agent (relative to decabromodiphenylethane) typically will be required. As an alternative to the previously mentioned processes for bromination of a poly(bromoaryl) alkane, additives of this invention may also be produced by simply mixing together a previously fabricated poly (bromoaryl)alkane and a previously fabricated poly (bromoaryl)bromoalkane, so as to form an additive of this invention.

Additives in accordance with this invention are surprisingly stable and have favorable morphology characteristics. The additive composition of this invention may be used as a flame retardant in formulation with virtually any flammable material. The material may be macromolecular, for example, a cellulosic material or a polymer. Illustrative polymers are: olefin polymers, cross-linked and otherwise, for example, homopolymers of ethylene, propylene, and butylene; copolymers of one or more of such alkylene monomers and any other copolymerizable monomers, for example, ethylene/propylene copolymers, ethylene/ethyl acrylate copolymers and ethylene/vinyl acetate copolymers; polymers of olefinically unsaturated monomers, for example, polystyrene, e.g., high impact polystyrene, and styrene copolymers; polyurethanes; polyamides; polyimides; polycarbonates; polyethers; acrylic resins; polyesters, especially poly(ethyleneterephthalate) and poly (butyleneterephthalate); epoxy resins; alkyls; phenolics; elastomers, for example, butadiene/styrene copolymers and butadiene/acrylonitrile copolymers; terpolymers of acrylonitrile, butadiene and styrene; natural rubber; butyl rubber, and polysiloxanes. The polymer may also be a blend of various polymers. Further, the polymer may be, where appropriate, cross-linked by chemical means or by irradiation. Other preferred substrate or host polymers include the following:

a) Thermoplastic polyesters, such as polyethylene terephthalate, and especially one or more of such thermoplastic polyesters as polypropylene terephthalate, polybutylene terephthalate, polycyclohexylene dimethylene terephthalate, and related copolyesters and blends, including blends of one or more thermoplastic polyesters with one or more other thermoplastic polymers such as polycarbonates, and especially aromatic polycarbonates.

b) Glass-reinforced thermoplastic polyesters, such as polyethylene terephthalate, and especially one or more of such glass-reinforced thermoplastic polyesters as polypropylene terephthalate, polybutylene terephthalate, polycyclohexylene dimethylene terephthalate, and related copolyesters and blends, including blends of one or more thermoplastic polyesters with one or more other thermoplastic polymers such as polycarbonates, and especially aromatic polycarbonates.

c) Thermoplastic polyamides, especially one or more of such thermoplastic polyamides such as nylon 6, nylon 6,6, nylon 6,9, nylon 6,10, nylon 6,12, nylon 11, nylon 12, nylon 12,12, nylon 6/6,6 copolymer, and high temperature nylons such as nylon 4,6, and partially aromatic nylons (e.g., Ixef polyarylamide PA MXD6 from Solvay, Zytel HTN from DuPont, and Amodel polyarylamide from Amoco). Other polyamides which may be used include Stanyl polyamide 46 from DSM, Vydyne polyamide 6/66 copolymers from Monsanto, polyamide 612 (Vestamid D from Creanova), and similar polyamides. Of the various nylon polymers, nylon 6 and nylon 6,6 are the preferred substrate polymers.

d) Glass-reinforced thermoplastic polyamides, especially one or more of such glass-reinforced thermoplastic polyamides as glass-reinforced nylon 6, nylon 6,6, nylon 6,9, nylon 6,10, nylon 6,12, nylon 11, nylon 12, nylon 12,12, nylon 6/6,6 copolymer, or glass-reinforced high temperature nylons such as nylon 4,6, and partially aromatic nylons (e.g., Ixef polyarylamide PA MXD6 from Solvay, Zytel HTN from DuPont, and Amodel polyarylamide from Amoco). Other glass-reinforced polyamides which may be used include glass-reinforced Stanyl polyamide 46 from DSM, Vydyne polyamide 6/66 copolymers from Monsanto, polyamide 612 (Vestamid D from Creanova), and similar polyamides. Of the various glass-reinforced nylon polymers, those of nylon 6 and nylon 6,6 are the preferred substrate polymers.

e) Vinylaromatic polymers such as polystyrene, and poly (alpha-methylstyrene), and copolymers of two or more styrenic monomers such as styrene, alpha-methylstyrene, and vinylnaphthalene, homopolymers of ring alkyl-substituted vinylaromatic monomers such as individual or mixed ar-methylstyrene isomers, individual or mixed ar-ethylstyrene isomers, individual or mixed ar-methyl isomers of alpha-methylstyrene, and copolymers of two or more such vinylaromatic monomers.

f) Rubber-modified vinylaromatic polymers such as high impact polystyrene (HIPS), and rubber-modified poly (alpha-methylstyrene), and rubber-modified copolymers of two or more styrenic monomers such as styrene, alpha-methylstyrene, and vinylnaphthalene, rubber-modified homopolymers of ring alkyl-substituted vinylaromatic monomers such as individual or mixed ar-methylstyrene isomers, individual or mixed ar-ethylstyrene isomers, individual or mixed ar-methyl isomers of alpha-methylstyrene, and rubber-modified copolymers of two or more such vinylaromatic monomers.

g) Alpha-olefin homopolymers such as polyethylene, polypropylene, polybutene, and copolymers of ethylene and/or propylene with one or more higher alpha-olefins and/or diolefinic monomers.

h) Blends of at least two different thermoplastic polymers such as polyphenylene ether/polystyrene blends, polyphenylene ether/rubber-modified polystyrene blends, and aromatic polycarbonate/ABS blends.

The amount of additive composition used in a formulation will be that quantity needed to obtain the flame retardancy sought. It will be apparent to those skilled in the art that for all cases no single precise value for the proportion of the product in the formulation can be given, since this proportion will vary with the particular flammable material, the presence of other additives and the degree of flame retardancy sought in any given application. Further, the proportion necessary to achieve a given flame retardancy in a particular formulation will depend upon the shape of the article into which the formulation is to be made, for example, electrical insulation, tubing and film will each behave differently. In general, however, the formulation may contain in the range of about 5 to about 40 weight percent, preferably in the range of about 10 to about 30 percent, of the additive composition when it is the only flame retardant component in the formulation.

It is especially advantageous to use the composition with an inorganic compound, especially ferric oxide, zinc oxide, zinc borate, the oxide of a Group V element, for example, bismuth, arsenic, phosphorus and especially antimony, in the formulation. Of these compounds, which are well known flame retardant synergists, antimony oxides are especially preferred. If such a compound is present in the formulation, the quantity of additive composition needed to achieve a given flame-retardancy is accordingly reduced. Generally, the additive composition and the inorganic compound are in a weight ratio of in the range of about 1:1 to about 7:1; and preferably in the range of about 2:1 to about 4:1. Formulations containing a flame retardant system comprised of the composition of this invention and the above inorganic compounds may contain up to about 40 percent by weight of the system, more typically in the range of about 3 to about 30 percent by weight of the system, and in some applications, depending upon the flamable material in the formulation and the desired level of flame retardancy, preferably in the range of about 20 percent to about 30 percent by weight.

Any of the additives usually present in formulations, e.g., plasticizers, antioxidants, fillers, (e.g., talc, glass, etc.), pigments, processing aids, UV stabilizers, and the like can be used in formulation with the composition of this invention. Thermoplastic articles formed from formulations containing a thermoplastic polymer and an additive composition of this invention can be produced conventionally, e.g., by injection molding, extrusion molding, compression molding, and the like.

The following Examples illustrates some of the features of the invention described herein and is not to be taken as limiting such invention.

EXAMPLE 1

Comparative

A 500 mL, four-necked flask was equipped with a mechanical stirrer, a thermometer with a temperature regulator, a glycol-cooled(5° C.) reflux condenser, a nitrogen flush assembly, a heating mantle and an ice-cold caustic scrubber. The flask was charged with ethylene dibromide (250 mL), containing 2.1 g of bromine(13.1 mmol), followed by decabromodiphenylethane wet cake (product obtained directly after filtration in the plant, undried and unground), 5.5 g (5.66 mmol). The slurry was stirred under nitrogen and heated to reflux (128° C.) continuously throughout the entire reaction period. The light source was now turned on and the entire reactor was exposed to this light to affect the desired photobromination. The common sun lamp, using a 250 watt reflectance bulb Model 250 R 40, manufactured by GE, was used as the light source. Within about five minutes of illumination, the reaction began as was evidenced from the HBr evolution, while the reflux temperature started increasing rapidly. In the next five minutes (total 10 minutes from the time illumination began), all bromine appeared to have reacted as no red color remained and the refluxing solvent was colorless. The light source was turned off and the reaction mixture was allowed to cool slowly to 50° C. and then cooled in ice bath to about 10° C. to precipitate most of the product. The resulting solid was filtered (sintered glass funnel, medium), washed with acetone to remove residual ethylene dibromide and then dried in an oven at 100° C. for 20 minutes. This gave a white, crystalline solid, weighing 4.95 g (90%). This solid had a melting point of 358–362° C. indicating it to be almost pure decabromodiphenylethane. A gas chromatograph analysis confirmed this to be so as it showed the composition to be 0.23% DPE-Br8, 0.93 area % DPE-Br9 and 98.83 area % DPE-Br10 (decabromodiphenylethane). The ethylenedibromide solvent was now analyzed by gas chromatograph-mass spectrometer which showed that the solvent contained about 0.34 area % 1,1,2-tribromoethane indicating that the solvent was brominated preferentially in this photobromination reaction.

EXAMPLE 2

Photobromination of decabromodiphenylethane to Dodecabromodiphenylethane in Chlorobenzene Solvent A 500 mL, 4-necked flask was equipped with all the desired accessories almost identical to what was used in the above Example 1. The reactor was charged with chlorobenzene(300 mL, 330 g) in which 0.7 g (4.375 mmol) of bromine had been pre-weighed. Decabromodiphenylethane wet cake (10.0 g, 10.3 mmol) was now added and the slurry was stirred and heated to reflux under nitrogen. The 0.7 g (4.375 mmol) bromine contained in the solvent was sufficient to convert 2.1 g decabromodiphenylethane (21% of the total 10 g charged initially) completely to dodecabromodiphenylethane. Since the solubility of decabromodiphenylethane in refluxing chlorobenzene is about 0.9 weight percent, approximately 2.97 g of the material is expected to be in solution, which is more than required for the reaction to occur. When the reflux was achieved (133° C.), the light source was turned on. Within about ten minutes of turning the light source on, the red bromine color started fading until after about 55 minutes of reaction under illumination, all bromine appeared to have been used up as no more red color was seen and the slurry was pale yellow colored. The heat and light source were both turned off and the slurry was allowed to cool slowly to about 40° C., followed by cooling in an ice bath to 15° C. The solid obtained after cooling was filtered through a sintered glass funnel (medium), followed by washing with acetone to remove excess solvent. The product was dried in air for 48 hours to give 8.24 g (82.4%) of a white solid which melted at 358–362° C. The GC analysis showed this material to be composed of 94.2% Br10-DPE, 4.86% Br9-DPE, and a small amount (0.3%) of a product having a retention time about 2 minutes longer than decabromodiphenylethane, which is deemed to be dodecabromodiphenylethane.

The chlorobenzene filtrate was now concentrated on the rotary evaporator to give a solid residue which was slurried with acetone and then filtered. The residue was now dried in an oven at 100° C. for 30 minutes to give a cream-colored powder weighing 2.1 g (21%) which showed a capillary melting point of 380–386° C., which is about 20–25° C. higher than that of decabromodiphenylethane and, therefore, is reasonable for the higher brominated product. A differential scanning calorimetry (DSC) analysis was performed on this residue and was found to be totally different from that of decabromodiphenylethane and indicative of the presence of dodecabromodiphenylethane. Since the product had about 14% aliphatic bromine, it is expected to be more soluble than decabromodiphenylethane in common solvents. A comparison of the thermal behavior of the two products obtained in this run (A, recovered by filtration from the solvent and presumed mostly decabromodiphenylethane, and B, recovered by solvent evaporation and presumed predominantly dodecabromodiphenylethane) is shown in the DSC curves given in FIG. 1. This example is given to show that the two products namely decabromodiphenylethane and dodecabromodiphenylethane can be isolated separately from the same reaction, rather than as a mixture, if desired.

It is to be understood that the reactants and components referred to by chemical name or formula anywhere in the specification hereof, whether referred to in the singular or plural, are identified as they exist prior to coming into contact with another substance referred to by chemical name or chemical type (e.g., another reactant, a solvent, a diluent, or etc.). It matters not what preliminary chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and other materials are identified as reactants and components to be brought together in connection with performing a desired chemical reaction or in forming a mixture to be used in conducting a desired reaction. The fact that the substance, component, or ingredient may have lost its original identity through a chemical reaction or transformation or complex formation or assumption of some other chemical form during the course of such contacting, blending or mixing operations, is thus wholly immaterial for an accurate understanding and appreciation of this disclosure. Nor does reference to a substance, component, or ingredient by chemical name or formula exclude the possibility that during the desired reaction itself a substance, component, or ingredient becomes transformed to one or more transitory intermediates that actually enter into or otherwise participate in the reaction. In short, no representation is made or is to be inferred that the named substances, components, or ingredients must participate in the reaction while in their original chemical composition, structure or form.

Each and every patent or other publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented herein above. Rather, what is intended to be covered is that subject matter disclosed herein capable of being claimed and the equivalents thereof permitted as a matter of law.

That which is claimed is:

1. An additive mixture comprising (i) a poly(bromophenyl)alkane having in the molecule in the range of 13 to 60 carbon atoms and in the range of two to four phenyl groups wherein the phenyl groups each have two or more bromine substituents, and (ii) a poly(bromophenyl)bromoalkane having in the molecule in the range of 13 to 60 carbon atoms and in the range of two to four phenyl groups, said poly(bromophenyl)bromoalkane being in an amount which is greater than 25 wt %, based on the total weight of the additive mixture.

2. An additive mixture according to claim 1 wherein the alkane bridge of the poly(bromophenyl)bromoalkane has at least two carbon atoms in the bridge and at least one bromine atom substituent on the bridge.

3. An additive mixture according to claim 1 wherein the alkane bridge of the poly(bromophenyl)bromoalkane has at least two carbon atoms in the bridge and at least two bromine atom substituents on the bridge.

4. An additive mixture according to claim 1 wherein the alkane bridge of the poly(bromophenyl)bromoalkane has at least two carbon atoms in the bridge and a number of bromine substituents on the bridge equal to the number of carbon atoms in the bridge.

5. An additive mixture according to claim 1 wherein the poly(bromophenyl)alkane of (i) and the poly(bromophenyl)alkane of (ii) each have two phenyl groups.

6. An additive mixture according to claim 5 wherein the poly(bromophenyl)alkane of (i) is decabromodiphenylethane.

7. An additive mixture according to claim 6 wherein the poly(bromophenyl)bromoalkane of (ii) is dodecabromodiphenylethane.

8. An additive mixture according to claim 6 wherein the poly(bromophenyl)bromoalkane of (ii) is undecabromodiphenylethane.

9. An additive mixture according to claim 6 wherein the poly(bromophenyl)bromoalkane of (ii) is a mixture of undecabromodiphenylethane and dodecabromodiphenylethane.

10. An additive mixture according to claim 1 wherein the phenyl groups of the poly(bromophenyl)alkane of (i) are perbrominated.

11. An additive mixture according to claim 2 wherein the phenyl groups of the poly(bromophenyl)alkane of (i) are perbrominated.

12. An additive mixture according to claim 3 wherein the phenyl groups of the poly(bromophenyl)alkane of (i) are perbrominated.

13. An additive mixture according to claim 4 wherein the phenyl groups of the poly(bromophenyl)alkane of (i) are perbrominated.

14. An additive mixture according to claim 5 wherein the phenyl groups of the poly(bromophenyl)alkane of (i) are perbrominated.

15. An additive mixture according to claim 5 wherein the poly(bromophenyl)alkane of (i) is docabromodiphenylmethane.

16. An additive mixture according to claim 5 wherein the poly(bromophenyl)bromoalkane is dodecabromodiphenylethane.

17. An additive mixture according to claim 5 wherein the poly(bromophenyl)bromoalkane is undecabromodiphenylmethane.

18. An additive mixture according to claim 12 wherein the poly(bromophenyl)bromoalkane is dodecabromodiphenylethane.

19. An additive mixture according to claim 15 wherein the poly(bromophenyl)bromoalkane is undecabromodiphenylmethane.

20. An additive mixture according to claim 14 wherein the poly(bromophenyl)bromoalkane is undecabromodiphenylmethane.

* * * * *

UNITED STATES PATENT AND TRADEMARK OFFICE
CERTIFICATE OF CORRECTION

PATENT NO. : 6,743,825 B1
DATED : June 1, 2004
INVENTOR(S) : Raymond B. Dawson et al.

It is certified that error appears in the above-identified patent and that said Letters Patent is hereby corrected as shown below:

Title page,
Item [56], References Cited, OTHER PUBLICATIONS, "CAS Registry Handbook," reference, "CAS Registry Handbook, 623 RL; 84852-53-9; Supplement Part 1; 1983; 1page" and should read -- CAS Registry Handbook, 632 RL; 84852-53-9; Supplement Part 1; 1983; 1page --.

Column 10,
Line 48, claim 15 reads "An additive mixture according to Claim 5 wherein the poly(bromophenyl)alkane of (i) is docabromodiphenylmethane." and should read
-- An additive mixture according to Claim 5 wherein the poly(bromophenyl)alkane of (i) is decabromodiphenylmethane. --

Signed and Sealed this

Seventh Day of September, 2004

JON W. DUDAS
*Director of the United States Patent and Trademark Office*